(12) United States Patent
Yajima et al.

(10) Patent No.: US 11,345,024 B2
(45) Date of Patent: May 31, 2022

(54) DRIVE DEVICE AND ROBOT DEVICE

(71) Applicant: Sony Corporation, Tokyo (JP)

(72) Inventors: Shunsuke Yajima, Kanagawa (JP); Kazuo Hongo, Chiba (JP); Masaya Kinoshita, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/964,605

(22) PCT Filed: Dec. 19, 2018

(86) PCT No.: PCT/JP2018/046706
§ 371 (c)(1),
(2) Date: Jul. 24, 2020

(87) PCT Pub. No.: WO2019/150812
PCT Pub. Date: Aug. 8, 2019

(65) Prior Publication Data
US 2021/0046640 A1 Feb. 18, 2021

(30) Foreign Application Priority Data
Feb. 2, 2018 (JP) .............................. JP2018-017009

(51) Int. Cl.
*B25J 9/10* (2006.01)
*F16H 48/08* (2006.01)

(52) U.S. Cl.
CPC .............. *B25J 9/102* (2013.01); *F16H 48/08* (2013.01)

(58) Field of Classification Search
CPC . F16H 15/52; F16H 3/72; F16H 48/12; F16H 48/08; F16H 2048/082;
(Continued)

(56) References Cited

U.S. PATENT DOCUMENTS 9,140,344 B2 * 9/2015 Teng ..................... B25J 9/102
2005/0275367 A1 * 12/2005 Buehler ................. B25J 9/102
318/568.12
(Continued)

FOREIGN PATENT DOCUMENTS

JP 2001-263444 A 9/2001
JP 2009-269102 A 11/2009
(Continued)

OTHER PUBLICATIONS

International Search Report and Written Opinion dated Apr. 2, 2019 for PCT/JP2018/046706 filed on Dec. 19, 2018, 10 pages including English Translation of the International Search Report.

*Primary Examiner* — Jake Cook
*Assistant Examiner* — T. Scott Fix
(74) *Attorney, Agent, or Firm* — Xsensus LLP

(57) ABSTRACT

Provided is a drive device that can remove the influence of static friction by driving two drive axes with three drive units. A drive device includes: a first drive unit; a second drive unit; a third drive unit; a first differential unit connected to the first drive unit and the second drive unit; a second differential unit connected to the second drive unit and the third drive unit; and a control unit that controls the first to third drive units. The control unit controls the second drive unit at a constant speed, and controls a speed of each of the first drive unit and the third drive unit relative to that of the second drive unit.

8 Claims, 12 Drawing Sheets

(58) Field of Classification Search
CPC ........... B62K 17/00; B60L 15/20; B60L 3/00; H02K 7/116; B25J 9/102; H02P 5/69
USPC ....................................................... 74/490.05
See application file for complete search history.

(56) References Cited

U.S. PATENT DOCUMENTS

| | | | | |
|---|---|---|---|---|
| 2006/0011009 | A1* | 1/2006 | Koyama | B25J 15/0009 74/490.05 |
| 2009/0312870 | A1* | 12/2009 | Okuda | F16H 1/16 700/258 |
| 2012/0067150 | A1* | 3/2012 | Zhang | B25J 9/104 74/423 |
| 2012/0079904 | A1* | 4/2012 | Teng | B25J 17/00 74/380 |
| 2013/0167673 | A1 | 7/2013 | Teng et al. | |
| 2014/0083233 | A1* | 3/2014 | Mamba | B25J 17/00 74/490.05 |
| 2020/0047332 | A1* | 2/2020 | Salisbury, Jr. | B25J 9/104 |

FOREIGN PATENT DOCUMENTS

| | | |
|---|---|---|
| JP | 2010-264519 A | 11/2010 |
| JP | 2016-037268 A | 3/2016 |
| WO | WO-2013016229 A | 2/2013 |

\* cited by examiner

DRIVE DEVICE AND ROBOT DEVICE

CROSS-REFERENCE TO RELATED APPLICATIONS

The present application is based on PCT filing PCT/JP2018/046706, filed Dec. 19, 2018, which claims priority to JP 2018-017009, filed Feb. 2, 2018, the entire contents of each are incorporated herein by reference.

TECHNICAL FIELD

The technology disclosed in the present specification relates to a drive device and a robot device applied to drive a multi-link structure such as a robot.

BACKGROUND ART

Generally, an actuator such as a motor drives a drive axis of a multi-link structure such as a robot. Unfortunately, an actuator has factors difficult to be modeled and identified, such as friction. Improving accuracy of position control and force control is thus difficult. For example, in a case of driving at a very low speed, there arises a problem that the influence of static friction or dynamic friction causes non-smooth motion or stick slip operation.

For example, there has been proposed an actuator control device that uses a disturbance observer to remove the influence of disturbance difficult to be modeled, such as friction (e.g., see Patent Document 1). Furthermore, there has been proposed a twin drive system that drives one drive axis on the basis of relative speed between constantly rotating two motors (e.g., see Patent Document 2).

According to the latter twin drive system, each motor is constantly rotating, and does not receive the influence of static friction. The twin drive system outputs difference between the constantly rotating two motors by using a differential mechanism. This enables the influence of dynamic friction to be removed. Note, however, that, if the twin drive system is introduced for all drive axes of a robot, the number of motors used will be doubled. Unfortunately, this greatly increases manufacturing costs, and increases the inertia of each shaft and the size of a mechanism. Furthermore, the two same motors needs to be used for one drive axis, basically.

CITATION LIST

Patent Document

Patent Document 1: Japanese Patent Application Laid-Open No. 2009-269102
Patent Document 2: Japanese Patent Application Laid-Open No. 2001-263444

SUMMARY OF THE INVENTION

Problems to be Solved by the Invention

An object of the technology disclosed in the present specification is to provide a drive device and a robot device which can be applied to drive a multi-link structure such as, for example, a robot and reduces the influence of friction.

Solutions to Problems

The technology disclosed in the present specification has been made in view of the above-described problems, and a first aspect thereof is a drive device including: a first drive unit; a second drive unit; a third drive unit; a first differential unit connected to the first drive unit and the second drive unit; a second differential unit connected to the second drive unit and the third drive unit; and a control unit that controls the first to third drive units.

The first differential unit is driven on the basis of difference in motions of the first drive unit and the second drive unit, and the second differential unit is driven on the basis of difference in motions of the second drive unit and the third drive unit.

Furthermore, the control unit controls the second drive unit at a constant speed, controls a speed of each of the first drive unit and the third drive unit relative to that of the second drive unit, and controls drives of the first differential unit and the second differential unit.

Furthermore, a second aspect of the technology disclosed in the present specification is a robot device including: a first drive unit; a second drive unit; a third drive unit; a first differential unit connected to the first drive unit and the second drive unit; a second differential unit connected to the second drive unit and the third drive unit; a first arm part attached to the first differential unit; a second arm part attached to the second differential unit; and a control unit that controls the first to third drive units.

Effects of the Invention

According to the technology disclosed in the present specification, there can be provided a drive device and a robot device that can remove the influence of static friction by driving two drive axes with three drive units.

Note that the effects described in the present specification are merely illustrations, and the effects of the present invention are not limited thereto. Furthermore, the invention may further exhibit an additional effect in addition to the above-described effects.

Still other objects, features, and advantages of the technology disclosed in the present specification will become apparent from more detailed description based on the later-described embodiment and the accompanying drawings.

MODE FOR CARRYING OUT THE INVENTION

An embodiment of technology disclosed in the present specification will be described in detail below with reference to the accompanying drawings.

Figure 1:
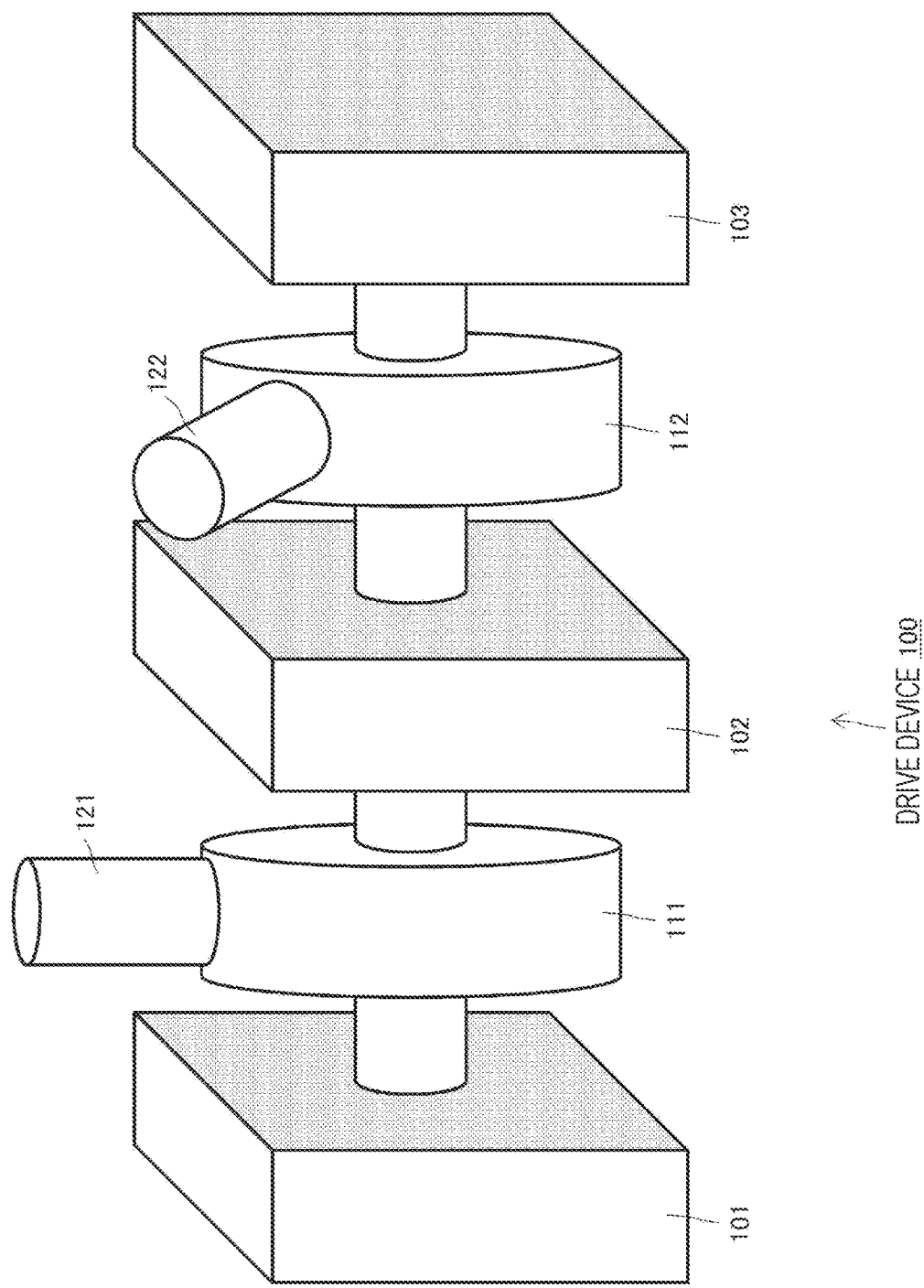
FIG. 1 schematically illustrates a configuration example of a drive device 100.

FIG. 1 schematically illustrates a configuration example of a drive device 100 to which the technology disclosed in the present specification is applied. In the illustrated drive device 100, two axes of arms can be simultaneously driven. The drive device 100 can be applied to a multi-link structure such as a robot.

The drive device 100 includes a first drive unit 101, a second drive unit 102, a third drive unit 103, a first differential unit 111, and a second differential unit 112. The first differential unit 111 is placed between the first drive unit 101 and the second drive unit 102. The second differential unit 112 is placed between the second drive unit 102 and the third drive unit 103. Furthermore, the drive device 100 includes a control unit (not illustrated) that controls each drive of the first to third drive units 101 to 103. Note that the control unit is a processing circuit that executes processing for controlling each of the drive units 101 to 103 by using a program. For example, the control unit is configured by a computer in which a central processing unit (CPU), a read only memory (ROM), and a random access memory (RAM) are mutually connected by a bus. Furthermore, the processing circuit may be implemented by a field-programmable gate array (FPGA).

The first to third drive units 101 to 103 include, for example, an actuator such as a motor, and are driven independently. The motor constituting the first to third drive units 101 to 103 may be equipped with, for example, an encoder and a torque sensor. The encoder detects the rotational position of an output shaft. The torque sensor detects external torque that acts on the output shaft. Note, however, that the motors constituting the first to third drive units 101 to 103 are not required to be the same. The motor includes, for example, a stepping motor, a servo motor, and a DC motor. A direct-acting motor may be used as long as the motor includes a mechanism for converting linear motion to rotary motion.

The first differential unit 111 is driven by operation difference that is generated when the first drive unit 101 and the second drive unit 102 operate independently. The first differential unit 111 includes a (later-described) differential mechanism. It can be said that the first drive unit 101 and the second drive unit 102 are connected to each other via the differential mechanism of the first differential unit 111. Then, in a case where both of the first and second drive units 101 and 102 include a motor, and rotationally and independently operate, a drive axis of the first differential unit 111 rotates on the basis of difference between rotation speeds of these two motors. Note, however, that the second drive unit 102 is basically controlled to be fixed at a constant speed (which is described above), and the first drive unit 101 is controlled to have a speed relative to the constant speed of the controlled second drive unit 102. Furthermore, a first arm part 121 attached to the first differential unit 111 rotates around the drive axis of the first differential unit 111 on the basis of the difference between rotation speeds of these two motors.

Similarly, the second differential unit 112 is driven by operation difference that is generated when the second drive unit 102 and the third drive unit 103 operate independently. The second differential unit 112 includes a (later-described) differential mechanism. It can be said that the second drive unit 102 and the third drive unit 103 are connected to each other via the differential mechanism of the second differential unit 112. Then, in a case where both of the second and third drive units 102 and 103 include a motor, and rotationally and independently operate, a drive axis of the second differential unit 112 rotates on the basis of difference between rotation speeds of these two motors. Note, however, that the second drive unit 102 is basically controlled to be fixed at a constant speed, and the third drive unit 103 is controlled to have a speed relative to the constant speed of the controlled second drive unit 102. Furthermore, a second arm part 122 attached to the second differential unit 112 rotates around the drive axis of the second differential unit 112 on the basis of the difference between rotation speeds of these two motors.

Configuring the first differential unit 111 with a differential gear mechanism enables rotary motion around the drive axis of the first differential unit 111 on the basis of difference between the rotation speed of the first drive unit 101 and that of the second drive unit 102. The first and second drive units 101 and 102 are connected to both ends. Similarly, configuring the second differential unit 112 with a differential gear mechanism enables rotary motion around the drive axis of the second differential unit 112 on the basis of difference between the rotation speed of the second drive unit 102 and that of the third drive unit 103. The second and third drive units 102 and 103 are connected to both ends.

Then, the control unit performs constant-speed control so that the second drive unit 102 has a constant rotation speed while controlling each of rotation speeds of the first and third drive units 101 and 103 relative to that of the second drive unit 102. The control unit can thereby independently drive the drive axis of the first differential unit 111 and the drive axis of the second differential unit 112, and optionally operate the first and second arm parts 121 and 122.

Figure 2:
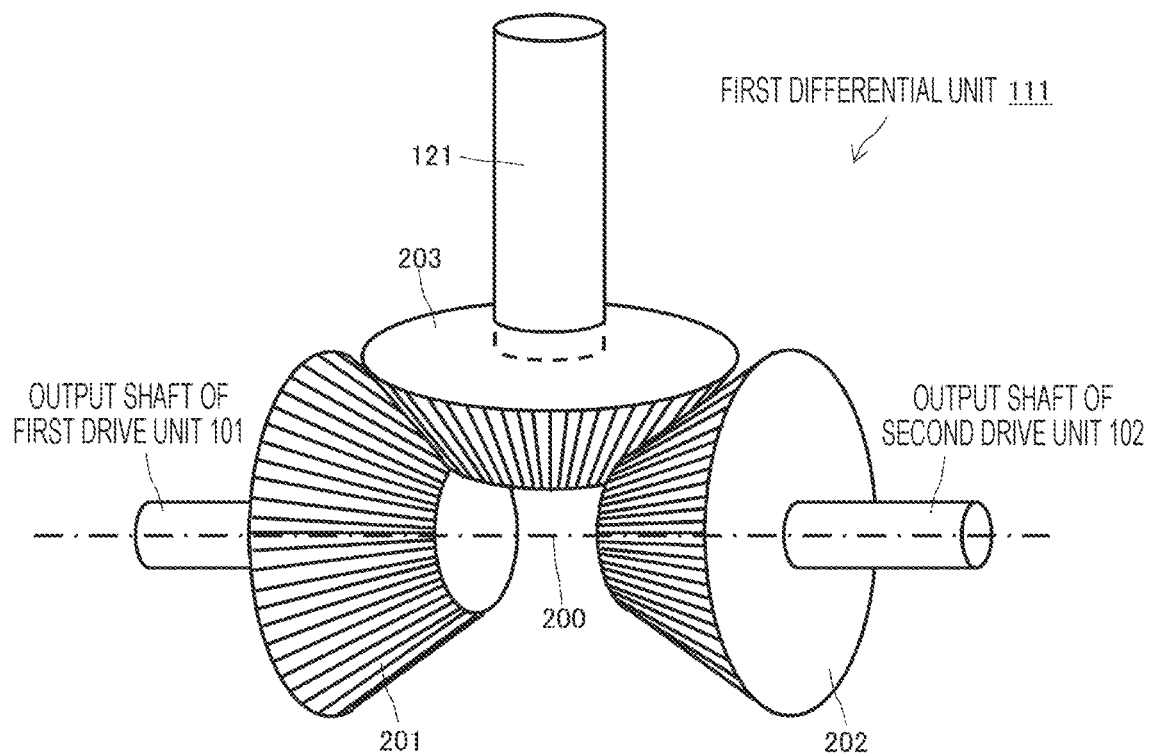
FIG. 2 illustrates a configuration example of a first differential unit 111 with a differential gear mechanism.

FIG. 2 illustrates a configuration example of the first differential unit 111 with a differential gear mechanism. The illustrated first differential unit 111 includes a first side gear 201, a second side gear 202, and a pinion gear 203. The first side gear 201 is attached to an end of an output shaft of the first drive unit 101. The second side gear 202 is attached to an end of an output shaft of the second drive unit 102. The pinion gear 203 is integrated with the first arm part 121. The output shaft of the first drive unit 101 coincides with the rotation axis of the first side gear 201. The output shaft of the second drive unit 102 coincides with the rotation axis of the second side gear 202. Then, the first and second side gears 201 and 202 are disposed so as to face each other. The common rotation axis corresponds to a drive axis 200 of the first differential unit 111. Furthermore, each of the gears 201 to 203 includes a bevel gear. The pinion gear 203 is engaged with both of the first and second side gears 201 and 202. Consequently, the first arm part 121 integrated with the pinion gear 203 rotates around the drive axis 200. Here, for the sake of simplifying the description, the gear ratio of the first side gear 201 and the second side gear 202 is assumed as 1:1. Note that, although not illustrated in FIG. 2 for convenience of description, a casing covers each of the gears 201 to 203.

Figure 3:
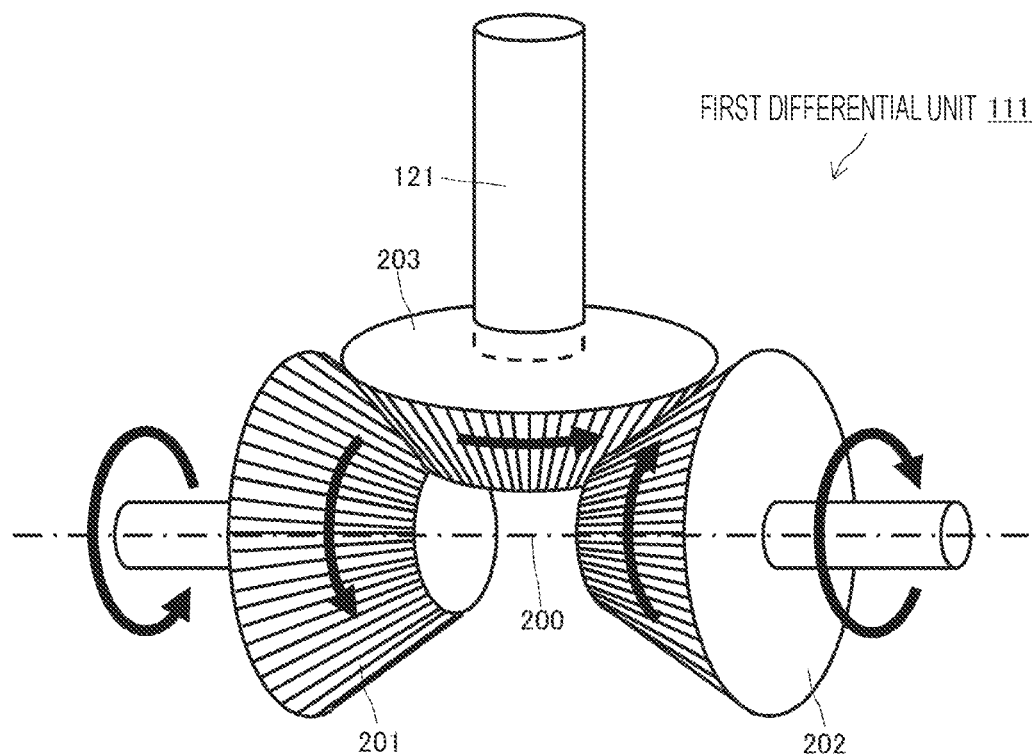
FIG. 3 illustrates an operation example of the first differential unit 111.
Figure 4:
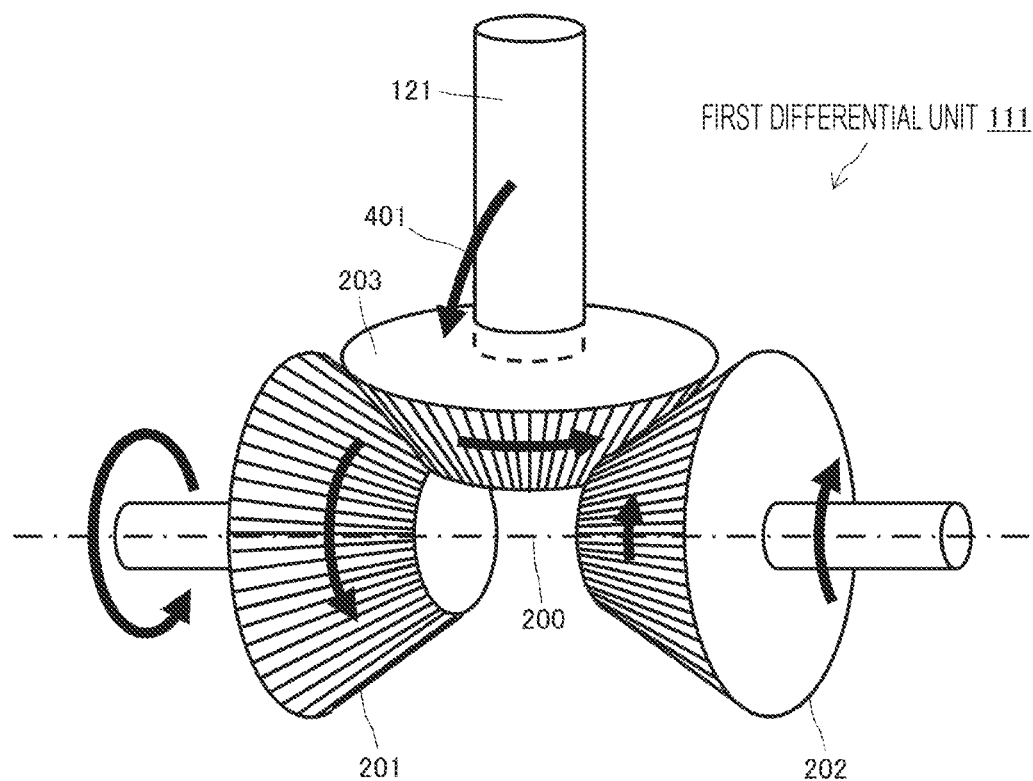
FIG. 4 illustrates an operation example of the first differential unit 111.
Figure 5:
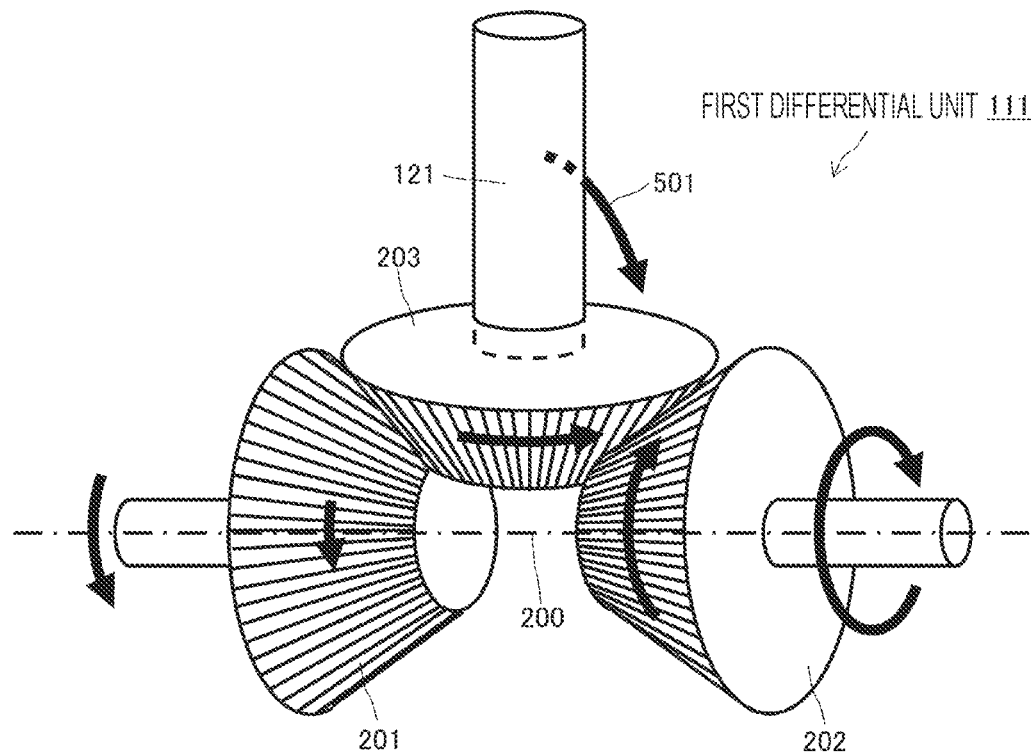
FIG. 5 illustrates an operation example of the first differential unit 111.

In a case where the first and second drive units 101 and 102 rotate in opposite directions at the same speed, as illustrated in FIG. 3, the drive axis 200 of the first differential unit 111 does not rotate, and thus the first arm part 121 can remain static. Then, the rotation direction and rotation speed of the first arm part 121 around the drive axis 200 can be controlled by controlling a speed of the first drive unit 101 relative to that of the second drive unit 102, which rotates at a constant speed. For example, in a case where the rotation speed of the first drive unit 101 is larger than that of the second drive unit 102, as illustrated by an arrow 401 in FIG. 4, the first arm part 121 rotates around the drive axis 200 in the same rotation direction as that of the first drive unit 101. The drive speed of the first arm part 121 in the direction of the arrow 401 is increased by further raising the relative speed of the first drive unit 101. In contrast, in a case where the rotation speed of the first drive unit 101 is smaller than that of the second drive unit 102, as illustrated by an arrow 501 in FIG. 5, the first arm part 121 rotates around the drive axis 200 in the same rotation direction as that of the second drive unit 102. The drive speed of the first arm part 121 in the direction of the arrow 501 is increased by further lowering the relative speed of the first drive unit 101.

Normally, static friction difficult to be modeled is generated between the static first side gear 201 and the pinion gear 203 and between the static second side gear 202 and the pinion gear 203. In the embodiment, the arm part 121 is kept static by rotating the first and second drive units 101 and 102 in opposite directions at the same speed. That is, the influence of the static friction can be canceled by constantly operating the first side gear 201 and the pinion gear 203 and the second side gear 202 and the pinion gear 203.

Figure 6:
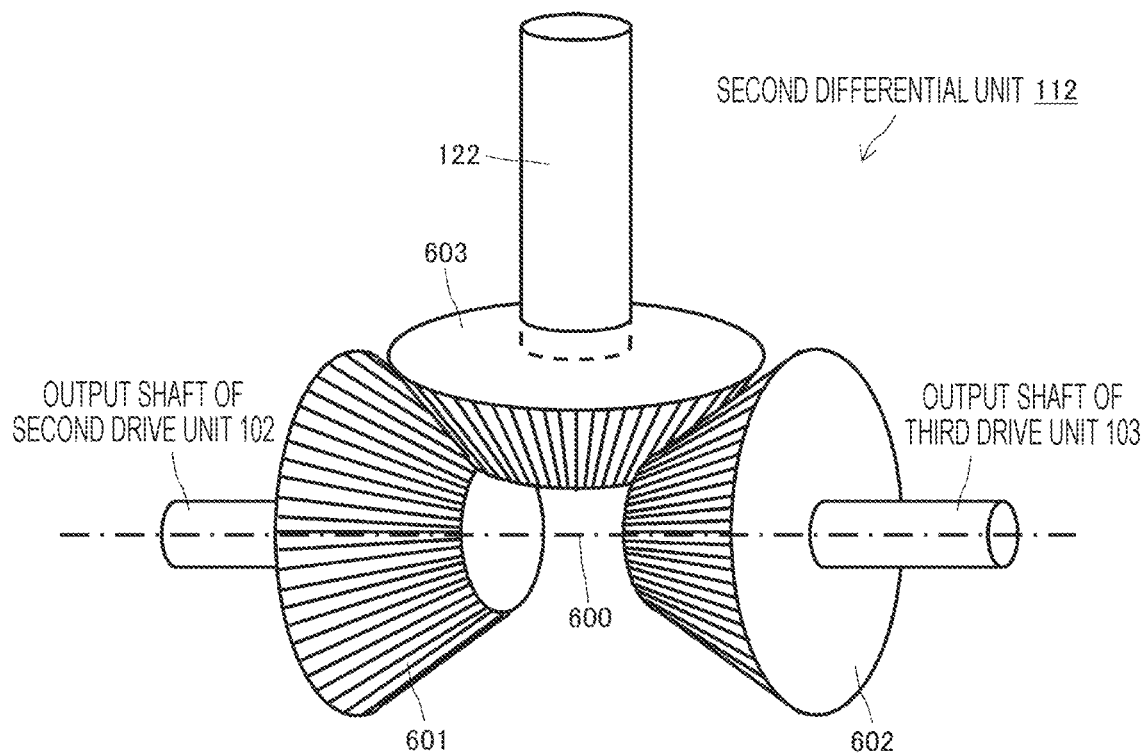
FIG. 6 illustrates a configuration example of a second differential unit 112 with a differential gear mechanism.

Furthermore, FIG. 6 illustrates a configuration example of the second differential unit 112 with a differential gear mechanism. The illustrated second differential unit 112 includes a first side gear 601, a second side gear 602, and a pinion gear 603. The first side gear 601 is attached to an end of an output shaft of the second drive unit 102. The second side gear 602 is attached to an end of an output shaft of the third drive unit 103. The pinion gear 603 is integrated with the second arm part 122. The output shaft of the second drive unit 102 coincides with the rotation axis of the first side gear 601. The output shaft of the third drive unit 103 coincides with the rotation axis of the second side gear 602. Then, the first and second side gears 601 and 602 are disposed so as to face each other. The common rotation axis corresponds to a drive axis 600 of the second differential unit 112. Furthermore, each of the gears 601 to 603 includes a bevel gear. The pinion gear 603 is engaged with both of the first and second side gears 601 and 602. Consequently, the second arm part 122 integrated with the pinion gear 603 rotates around the drive axis 600. Here, for the sake of simplifying the description, the gear ratio of the first side gear 601 and the second side gear 602 is assumed as 1:1. Note that, although not illustrated in FIG. 6 for convenience of description, a casing covers each of the gears 601 to 603.

Figure 7:
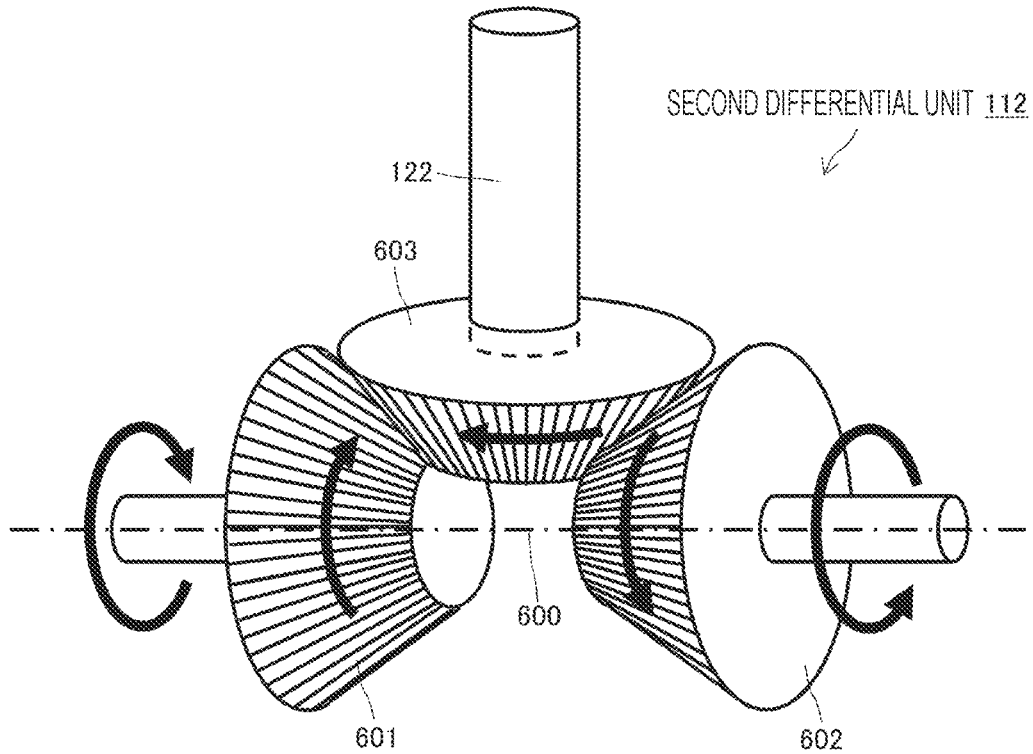
FIG. 7 illustrates an operation example of the second differential unit 112.
Figure 8:
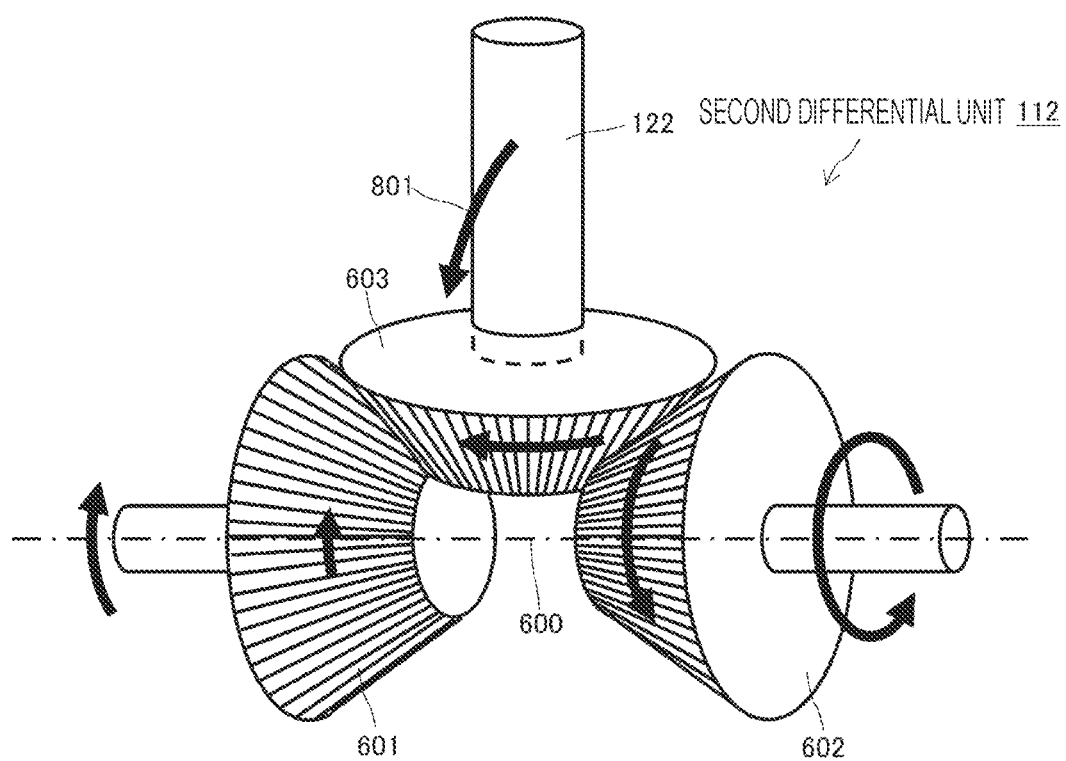
FIG. 8 illustrates an operation example of the second differential unit 112.
Figure 9:
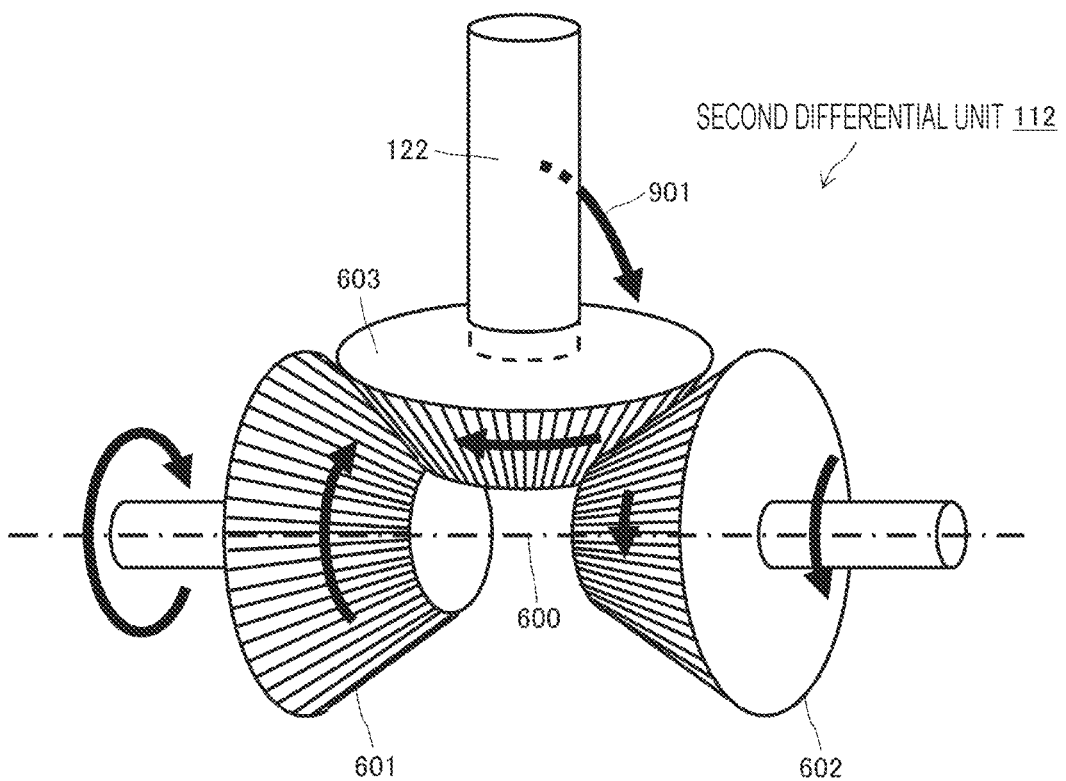
FIG. 9 illustrates an operation example of the second differential unit 112.

In a case where the second and third drive units 102 and 103 rotate in opposite directions at the same speed, as illustrated in FIG. 7, the drive axis 600 of the second differential unit 112 does not rotate, and thus the second arm part 122 can remain static. Then, the rotation direction and rotation speed of the second arm part 122 around the drive axis 600 can be controlled by controlling a speed of the third drive unit 103 relative to that of the second drive unit 102, which rotates at a constant speed. For example, in a case where the rotation speed of the third drive unit 103 is larger than that of the second drive unit 102, as illustrated by an arrow 801 in FIG. 8, the second arm part 122 rotates around the drive axis 600 in the same rotation direction as that of the third drive unit 103. The drive speed of the second arm part 122 in the direction of the arrow 801 is increased by further raising the relative speed of the third drive unit 103. In contrast, in a case where the rotation speed of the third drive unit 103 is smaller than that of the second drive unit 102, as illustrated by an arrow 901 in FIG. 9, the second arm part 122 rotates around the drive axis 600 in the same rotation direction as that of the second drive unit 102. The drive speed of the second arm part 122 in the direction of the arrow 901 is increased by further lowering the relative speed of the third drive unit 103.

Normally, static friction difficult to be modeled is generated between the static first side gear 601 and the pinion gear 603 and between the static second side gear 602 and the pinion gear 603. In the embodiment, the arm part 122 is kept static by rotating the second and third drive units 102 and 103 in opposite directions at the same speed. That is, the influence of the static friction can be canceled by constantly operating the first side gear 601 and the pinion gear 603 and the second side gear 602 and the pinion gear 603.

Note that, although FIGS. 2 to 5 and FIGS. 6 to 9 illustrate the first differential unit 111 and the second differential unit 112 using a differential mechanism with combined gears, each of the differential units 111 and 112 can be configured by another differential mechanism. For example, the first and second differential units 111 and 112 can be configured by a differential mechanism that transmits rotation by control force generated by frictional force.

To summarize the above, the second drive unit 102 and the first drive unit 101 and the third drive unit are coupled via the first differential unit 111 and the second differential unit 112. The second drive unit 102 is controlled to have a constant speed. The first drive unit 101 and the third unit are disposed on both ends of the second drive unit 102, and controlled to have a speed relative to that of the second drive unit 102. Each of the first and second differential units 111 and 112 includes a differential gear mechanism. Here, the reduction ratio of the first drive unit 101 and the second drive unit 102 is not required to be the same as that of the second drive unit 102 and the third drive unit 103. That is, a reduction gear may be provided on one output end without providing a reduction gear on another output end of either right or left of the second drive unit 102, which is controlled to have a constant speed.

By the way, different reduction ratios can change movements of two axes (i.e., two arm parts 121 and 122), which has an effect of increasing the degree of freedom in design. Furthermore, a pair of side gears 201 and 202 and a pair of side gears 601 and 602 are not required to be the same, and the size of one gear or one motor may be changed.

In the drive device 100 in FIG. 1, each of motors constituting the three drive units 101 to 103 constantly rotates and operates regardless of whether each of the arm parts 121 and 122 is operating or kept static. The influence of static friction can be canceled in a model-less manner, that is, canceled without a special mechanism or a compensation model.

Furthermore, as can be seen from FIG. 1, the drive device 100 has a configuration in which three motors drive two drive axes (i.e., 1.5 motors drive one drive axis). As compared with a twin drive system (described above) in which two motors are used for one drive axis, the smaller number of motors can constitute a multi-link structure having a configuration of the same degree of freedom. This exhibits an advantage that manufacturing costs can be reduced while the inertia of each shaft and the size of a mechanism can be inhibited. In addition, the drive device 100 is not required to use the same three motors for the three drive units 101 to 103.

Note that, although the drive device 100 in FIG. 1 includes the three drive units 101 to 103 disposed on the same straight line, the drive device 100 is not limited to such configuration. For example, a part of the drive units can be disposed at a position deviated from the same straight line by using a transmission mechanism such as a belt.

Figure 10:
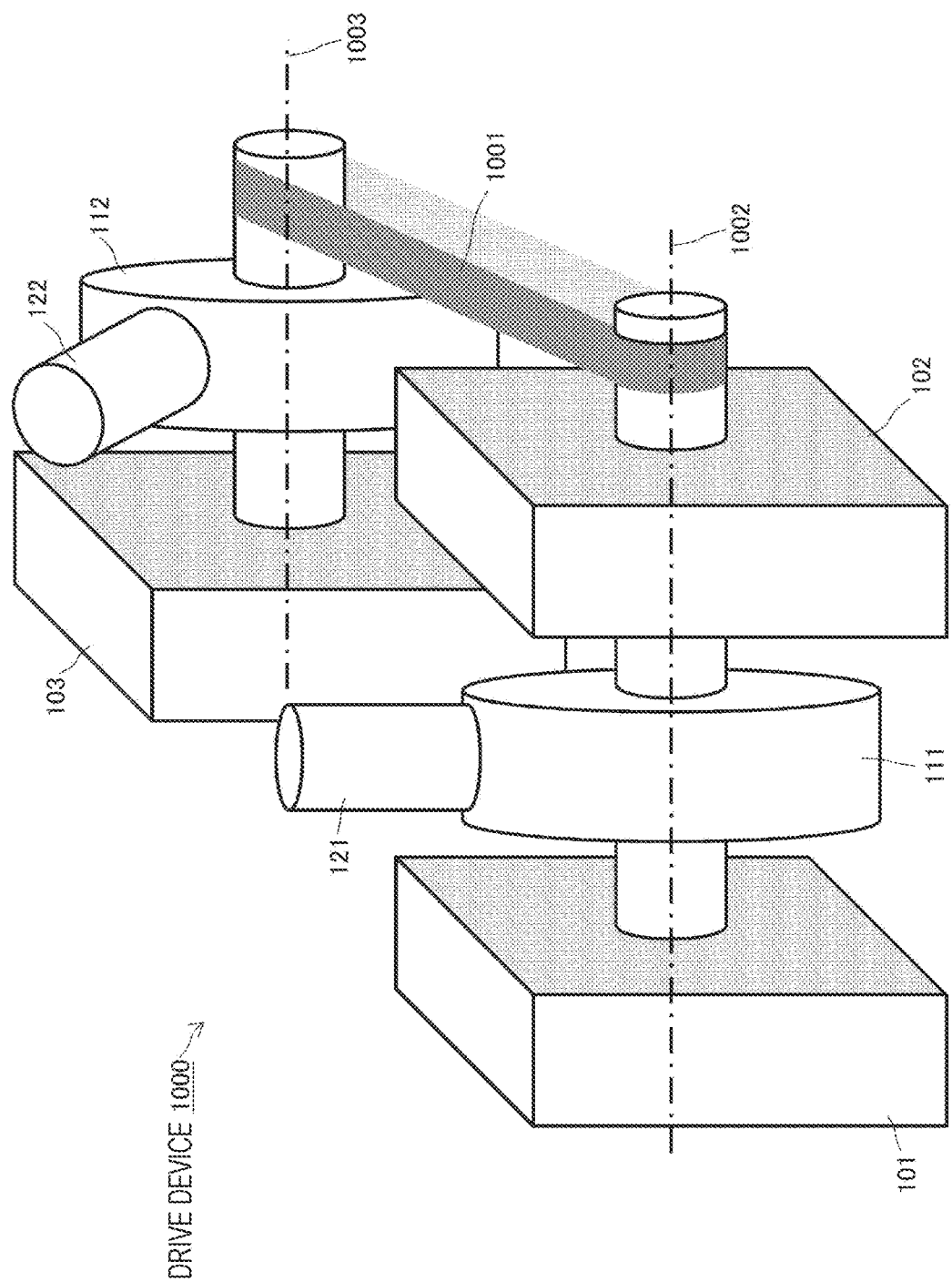
FIG. 10 illustrates a configuration example of the drive device 100.

FIG. 10 illustrates a configuration example of a drive device 1000. In the drive device 1000, the output shaft of the second drive unit 102 and the drive axis of the second differential unit 112 are coupled via a power transmission mechanism including a belt 1001. A drive axis 1003 of the third drive unit 103 is disposed at a place spaced apart from a drive axis 1002 of the first and second drive units 101 and 102.

Furthermore, although not illustrated, the drive axis of the first drive unit 101 can be disposed at a place spaced apart from the drive axis 1002 of the second drive unit 102 by coupling the other output shaft of the second drive unit 102 and the drive axis of the first differential unit 111 via a power transmission mechanism such as a belt.

In a case of the drive device 1000 in FIG. 10, the drive axis 1002 of the first and second drive units 101 and 102 and the spaced apart drive axis 1003 of the third drive unit 103 are placed in parallel with each other. Note, however, that the drive axis 1002 of the first and second drive units 101 and 102 and the spaced apart third drive unit 103 can have any angle by coupling the output shaft of the second drive unit 102 and the drive axis of the second differential unit 112 with a power transmission mechanism having a direction changing function.

In general, one or more gears are used to change the direction of transmitting power. Increased number of gears cause friction. According to the drive device 1000 of the embodiment, each of motors constituting the three drive units 101 to 103 constantly rotates and operates, and thus the influence of static friction can be canceled regardless of the number of gears used.

Figure 11:
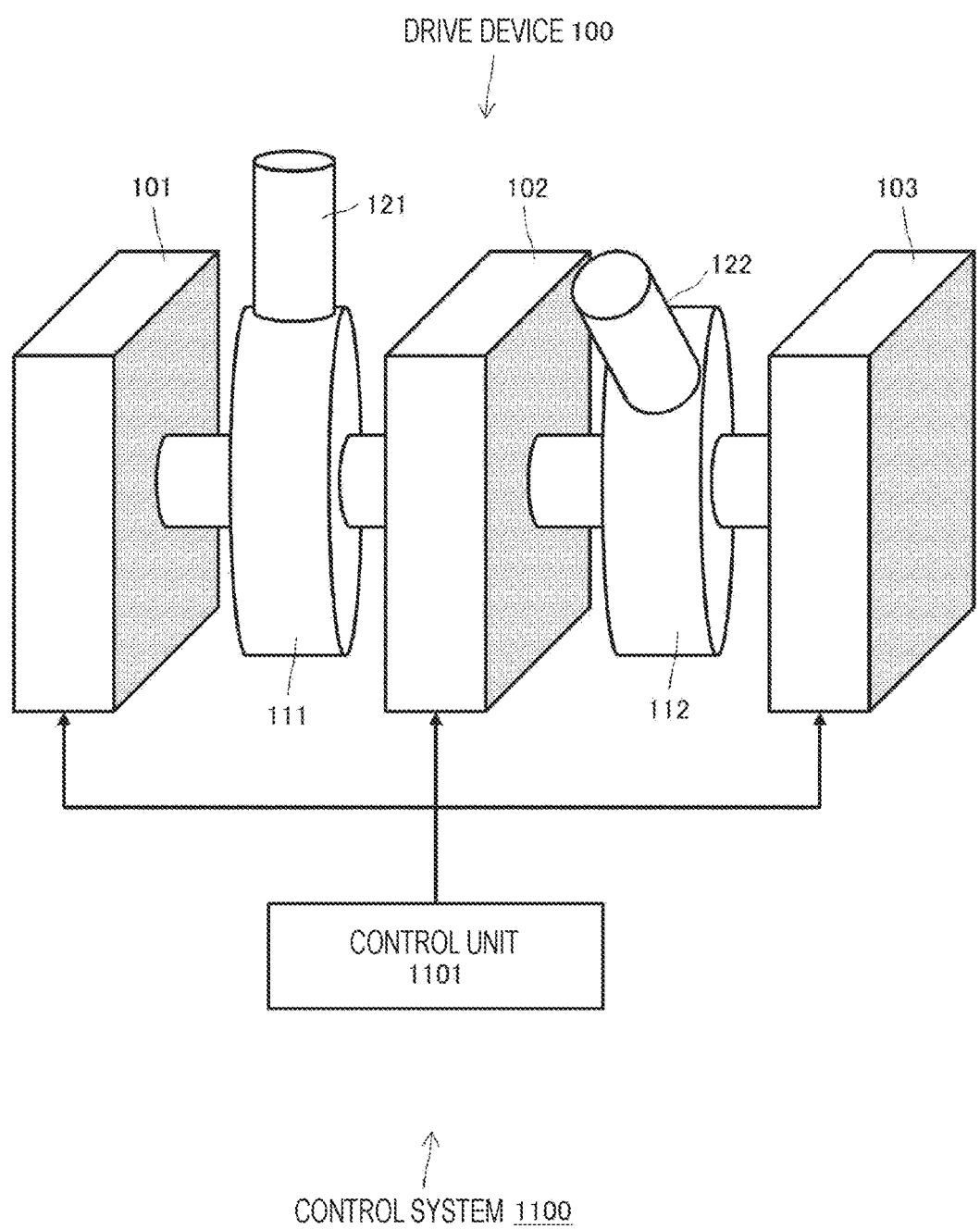
FIG. 11 schematically illustrates a configuration example of a control system 1100 of the drive device 100.

FIG. 11 schematically illustrates a configuration example of a control system 1100 of the drive device 100 in FIG. 1. Note that, although illustration and description are omitted, it should be understood that a control system of the drive device 1000 in FIG. 10 has a similar configuration.

The drive device 100 includes a first drive unit 101, a second drive unit 102, a third drive unit 103, a first differential unit 111, and a second differential unit 112. The first differential unit 111 is placed between the first drive unit 101 and the second drive unit 102. The second differential unit 112 is placed between the second drive unit 102 and the third drive unit 103 (same as above).

The first to third drive units 101 to 103 include, for example, an actuator such as a motor. Then, a control unit 1101 can independently drive and control the first to third drive units 101 to 103.

Consequently, the control unit 1101 can drive the first differential unit 111 by operation difference that is generated when the first drive unit 101 and the second drive unit 102 operate independently. Then, the first arm part 121 is attached to the first differential unit 111. The control unit 1101 can drive the first arm part 121 by operation difference between the first drive unit 101 and the second drive unit 102.

Furthermore, the control unit 1101 can drive the second differential unit 112 by operation difference that is generated when the second and third drive units 102 and 103 operate independently. Then, the second arm part 122 is attached to the second differential unit 112. The control unit 1101 can drive the second arm part 122 by operation difference between the second drive unit 102 and the third drive unit 103.

Furthermore, the control unit 1101 controls the second drive unit 102 disposed at the center at a constant speed, and fixes the speed. Then, the control unit 1101 controls a speed of each of the first and third drive units 101 and 103 relative to that of the second drive unit 102. The first and third drive units 101 and 103 are disposed on the right and left of the second drive unit 102. The second drive unit 102 is controlled at a constant speed. The operation difference in the first differential unit 111 is adjusted by controlling the relative speed of the first drive unit 101, and thereby the first arm part 121 can perform desired operation. Furthermore, the operation difference in the second differential unit 112 is adjusted by controlling the relative speed of the third drive unit 103, and thereby the second arm part 122 can perform desired operation. As a result, the control unit 1101 can cause the two arm parts 121 and 122 to perform any operation.

Even if at least one of the first arm part 121 or the second arm part 122 is static, the first to third drive units 101 to 103 constantly operate. Consequently, the influence of static friction can be canceled in a model-less manner, that is, canceled without a special mechanism or a compensation model.

Furthermore, the control unit 1101 may put a limitation such that the difference or the ratio of the speed of the first drive unit 101 relative to that of the second drive unit 102 and the speed of the third drive unit 103 relative to that of the second drive unit 102 is in a range of a predetermined value. This can inhibit the operation in which low-speed movement would rather be generated in a case where one of the first and second arm parts 121 and 122 moves at high speed.

Furthermore, fault-tolerant control, in which desired operation is continued even if a part of the first to third drive units 101 to 103 fails, can be achieved by using configuration in which 1.5 motors drive one drive axis.

Figure 12:
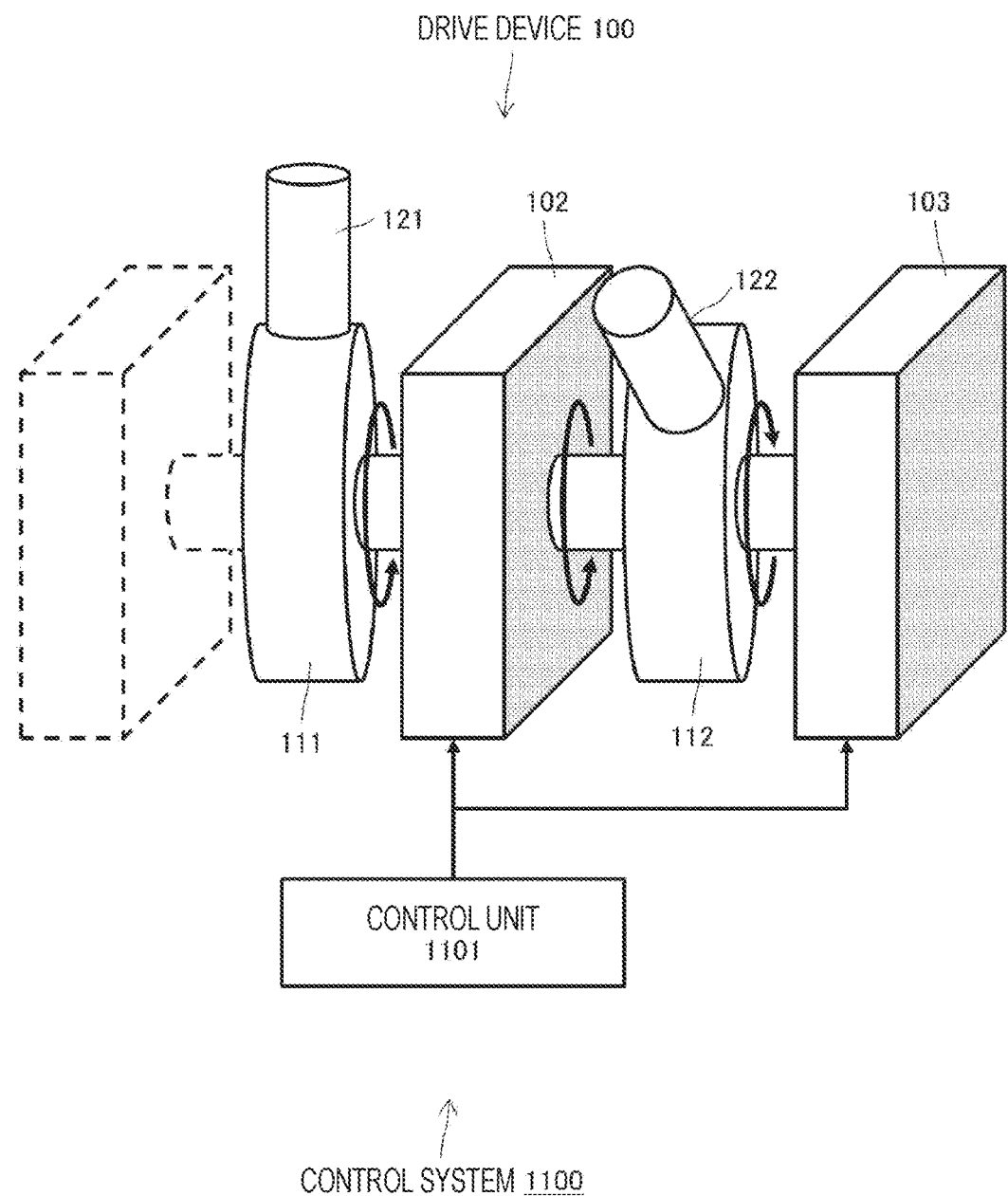
FIG. 12 illustrates an operation example of the control system 1100 at the time of failure.

For example, in a case where the first drive unit 101 fails, the control unit 1101 controls the drive of the first differential unit 111 by using only the second drive unit 102. Then, at that time as well, the drive of the second differential unit 112 is controlled on the basis of the speed of the third drive unit 103 relative to that of the second drive unit (see FIG. 12). In this case, the first arm part 121 operates following the drive speed of the second drive unit 102, and the second arm part 122 operates on the basis of the speed of the third drive unit 103 relative to that of the second drive unit 102.

Figure 13:
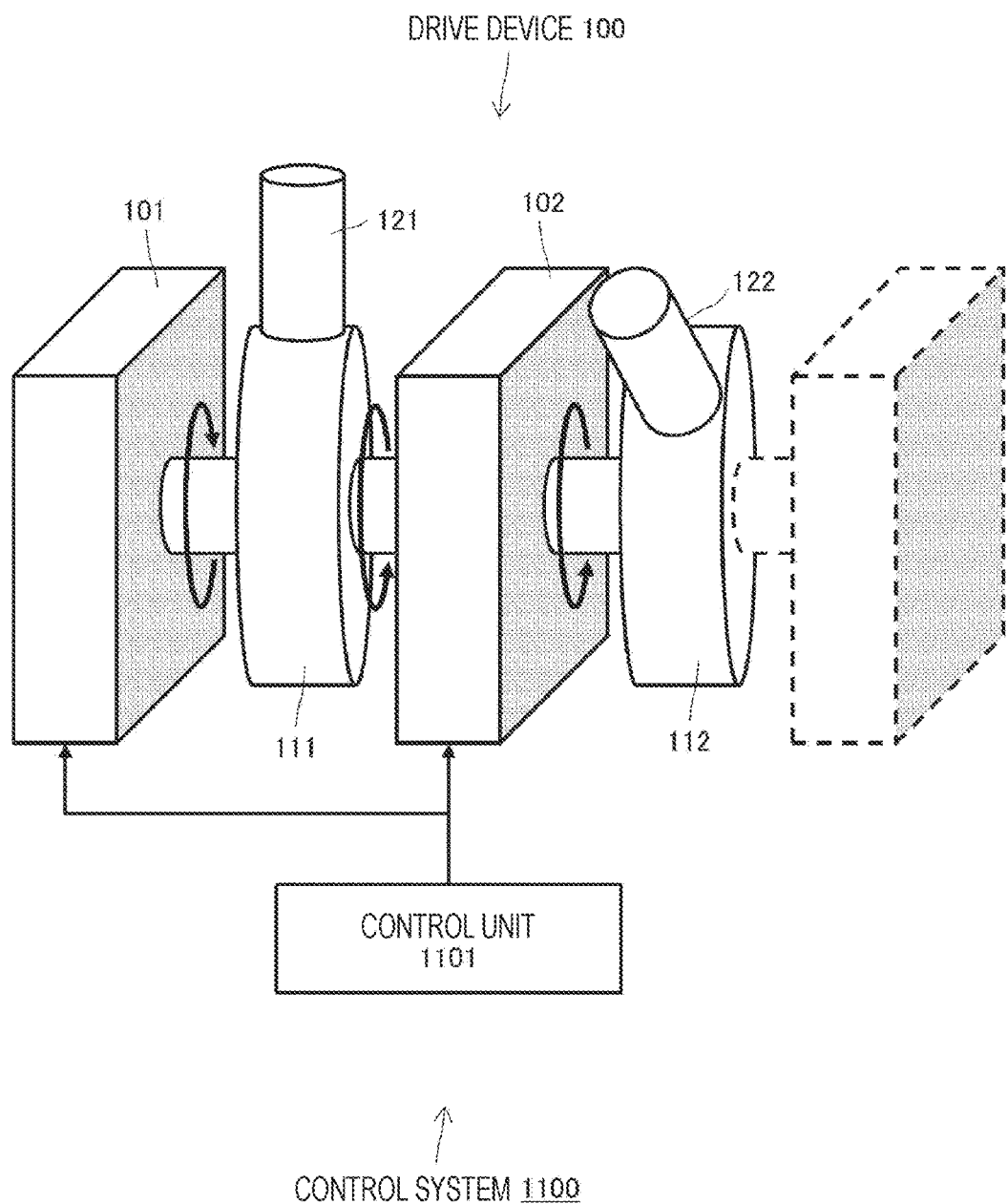
FIG. 13 illustrates an operation example of the control system 1100 at the time of failure.

Similarly, in a case where the third drive unit 103 fails, the control unit 1101 controls the drive of the second differential unit 112 by using only the second drive unit 102. Then, at that time as well, the drive of the first differential unit 111 is controlled on the basis of the speed of the first drive unit 101 relative to that of the second drive unit (see FIG. 13). In this case, the second arm part 122 operates following the drive speed of the second drive unit 102, and the first arm part 121 operates on the basis of the speed of the first drive unit 101 relative to that of the second drive unit 102.

Figure 14:
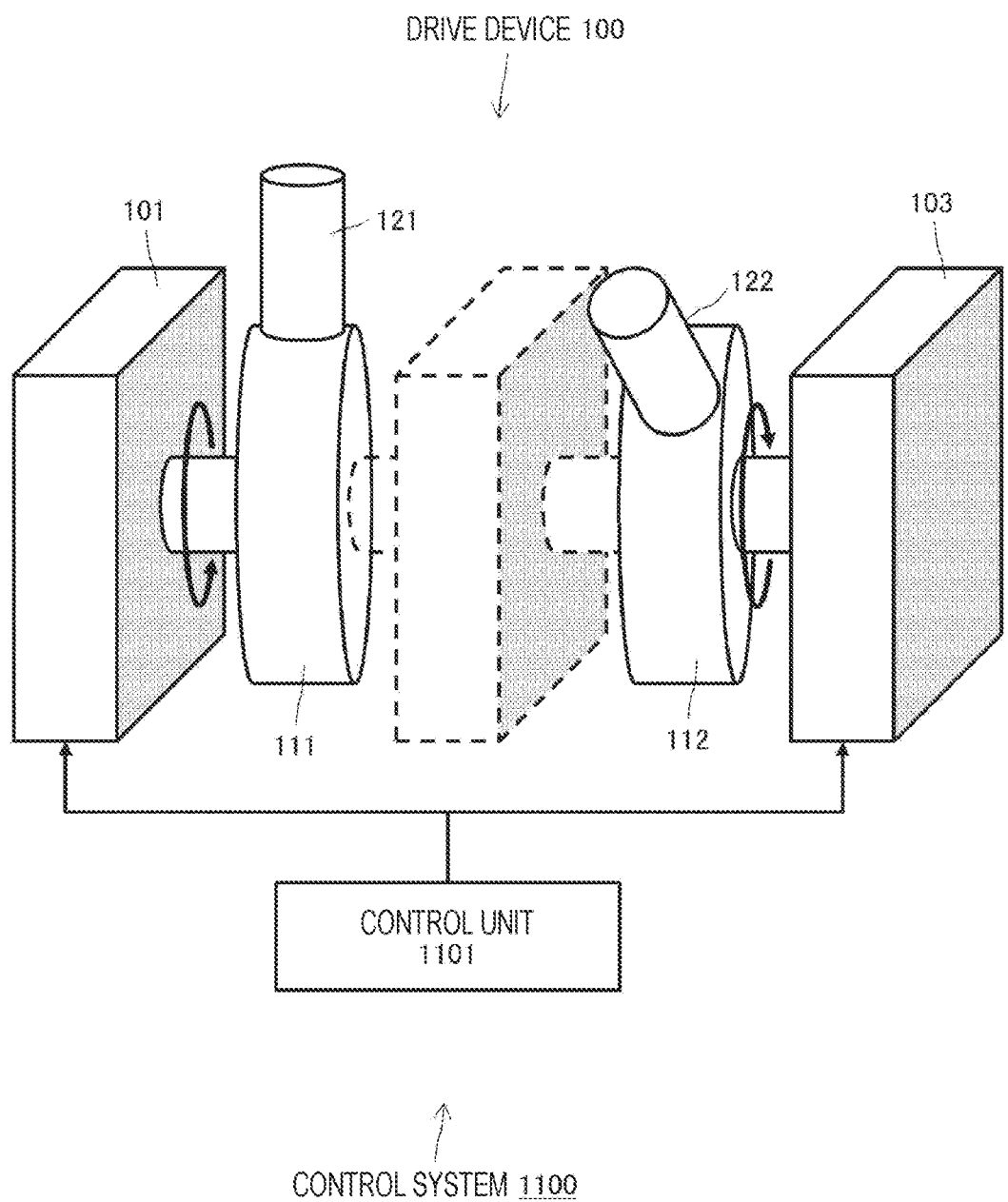
FIG. 14 illustrates an operation example of the control system 1100 at the time of failure.

In contrast, in a case where the central second drive unit 102 fails, the control unit 1101 separates the second drive unit 102 that does not operate normally, and drives and controls the first differential unit 111 with the first drive unit 101 while driving and controlling the second differential unit with the third drive unit 103 (see FIG. 14). In this case, the first arm part 121 operates following the drive speed of the second drive unit 102, and the second arm part 122 operates following the drive speed of the second drive unit 102.

Note that the control unit 1101 may detect failure on the basis of a detection signal from an encoder, a torque sensor, or another sensor element incorporated in a motor used for each of the drive units 101 to 130, and perform the above-described operation on the basis of the detection result. Alternatively, the control unit 1101 may perform the above-described operation in accordance with an instruction from the outside such as a user.

In the drive device 100 according to the embodiment, two axes of arms can simultaneously be driven. The drive device 100 can be applied to a multi-link structure such as a robot.

Figure 15:
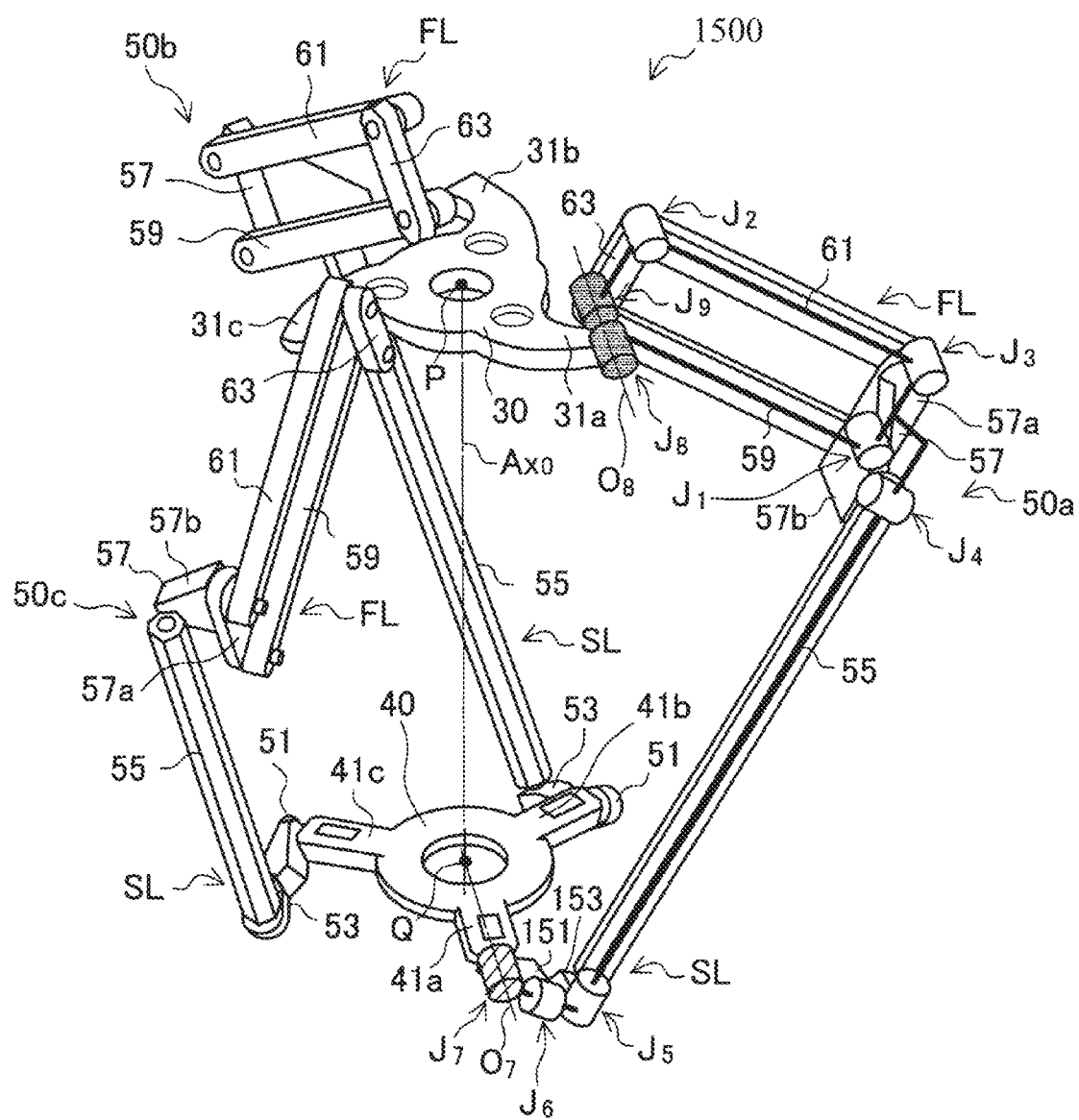
FIG. 15 illustrates a configuration example of a parallel link device 1500.
Figure 16:
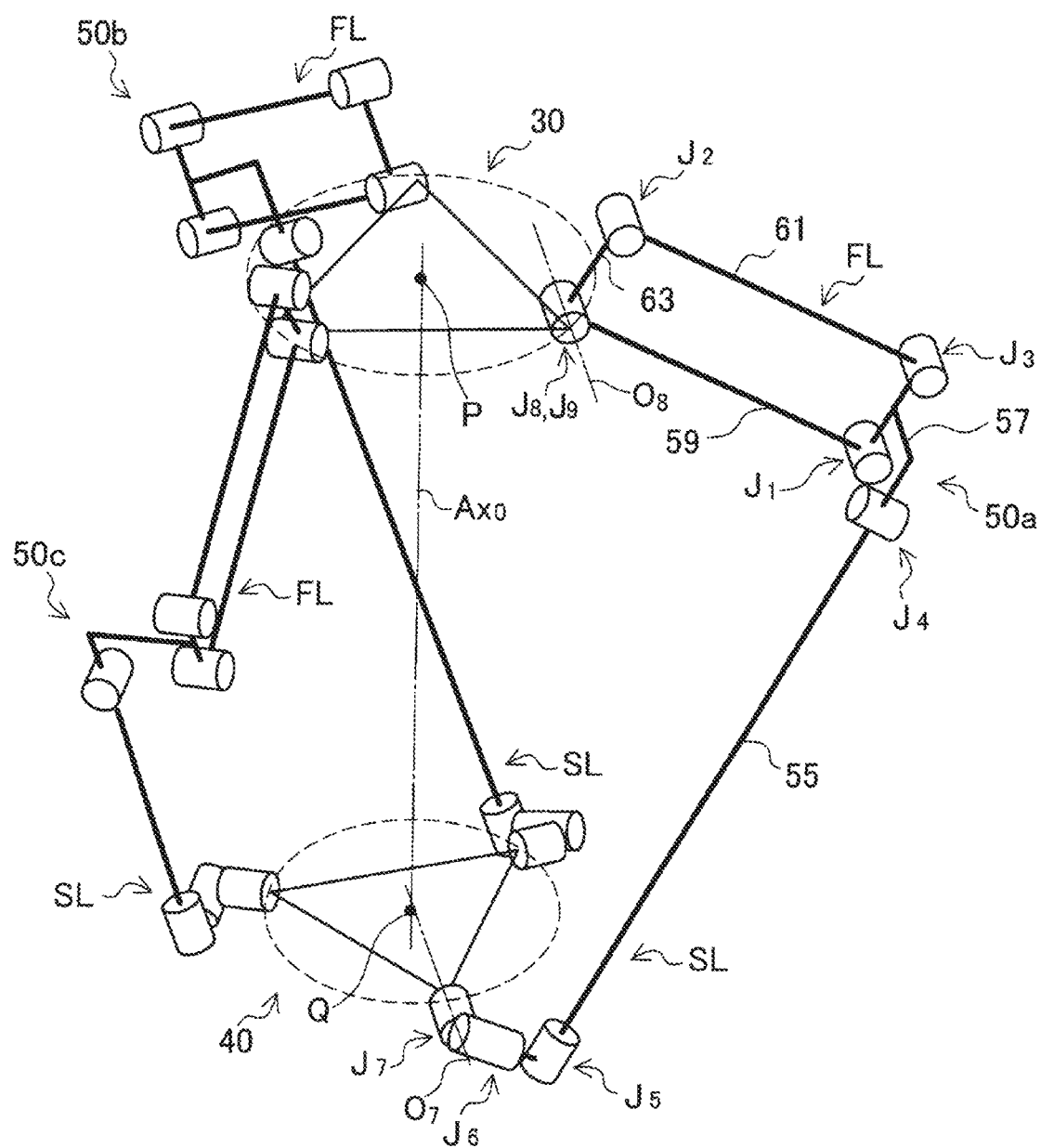
FIG. 16 illustrates the configuration of a degree of freedom of the parallel link device 1500 in FIG. 15.

FIG. 15 schematically illustrates a configuration example of a parallel link device 1500 to which the drive device 100 can be applied. Furthermore, FIG. 16 illustrates the configuration of a degree of freedom of the parallel link device 1500 in FIG. 15. Note that, in the present specification, a base-part side of a base part and a movable member in the parallel link device is also referred to as the front or a head-end side, and a movable-member side thereof is also referred to as the rear or a base-end side.

The parallel link device 1500 includes a base plate 30, a movable plate 40, a first link part 50a, a second link part 50b, and a third link part 50c. The base plate 30 serves as the base part. The movable plate 40 serves as the movable member. The first to third link parts 50a to 50c serve as a plurality of link parts disposed in parallel. The first to third link parts 50a to 50c are coupled between the base plate 30 and the movable plate 40.

The base plate 30 is used by being fixed to, for example, a truck, a support base, a support wall, a support column, a support beam, a ceiling, a floor surface, and the like (all not illustrated). The shape of the base plate 30 is not particularly limited. The base-end sides of the first to third link parts 50a to 50c are coupled to fixing parts 31a, 31b, and 31c, respectively. The fixing parts 31a, 31b, and 31c are provided on the base plate 30 at equal intervals every 120 degrees around a rotation center point P. The rotation center point P is for coupling positions of the base plate 30 and the first to third link parts 50a to 50c.

Furthermore, the head-end sides of the first to third link parts 50a to 50c are coupled to fixing parts 41a, 41b, and 41c, respectively. The fixing parts 41a, 41b, and 41c are provided on the movable plate 40 at equal intervals every 120 degrees around a rotation center point Q. The shape of the movable plate 40 is not particularly limited. The rotation center point Q is for coupling positions of the movable plate 40 and the first to third link parts 50a to 50c.

The first to third link parts 50a to 50c have the same configuration. The configuration of the link parts will be described with reference to FIG. 16, taking the first link part 50a as an example. The first link part 50a includes a four-joint link mechanism FL and a serial link mechanism SL. The four-joint link mechanism FL is coupled to the fixing part 31a of the base plate 30. The base-end side of the serial link mechanism SL is coupled to the four-joint link mechanism FL, and the head-end side thereof is coupled to the movable plate 40.

The serial link mechanism SL includes a first link 59, a second link 63, a third link 61, and a fourth link 157. The first link 59 is coupled to the fixing part 31a of the base plate 30 via a first active joint part $J_8$, which is a one-axis rotary joint. Furthermore, the second link 63 is coupled to the fixing part 31a of the base plate 30 via a second active joint part $J_9$, which is a one-axis active joint.

The first link 59 and the fourth link 57 are coupled by a first rotary joint part $J_1$, which is a one-axis rotary joint. Furthermore, the second link 63 and the third link 61 are coupled by a second rotary joint part $J_2$, which is a one-axis rotary joint. The third link 61 and the fourth link 57 are coupled by a third rotary joint part $J_3$, which is a one-axis rotary joint. The first to third rotary joint parts $J_1$ to $J_3$ and the first active joint part $J_8$ have a rotation axis parallel to each other. Therefore, the first link 59, the second link 63, the third link 61, and the fourth link 57 can constitute the four-joint link mechanism FL.

In the examples in FIGS. 15 and 16, the first and second active joint parts $J_8$ and $J_9$ are disposed on the same axis. The drive device 100 in FIG. 1 can be applied to drive the first and second active joint parts $J_8$ and $J_9$. Specifically, the first differential unit 111 constitutes the first active joint part $J_8$. The second differential unit 112 constitutes the second active joint part $J_9$. The first and second drive units 101 and 102 are disposed so as to sandwich the first active joint part $J_8$. The second and third drive units 102 and 103 are disposed so as to sandwich the second active joint part $J_9$. Note that the second active joint part $J_9$ is not required to be on the same axis as long as being disposed in parallel with the first active joint part $J_8$.

Here, the first active joint part $J_8$ can be driven by the operation difference between the first and second drive units 101 and 102, and the second active joint part $J_9$ can be driven by the operation difference between the second and third drive units 102 and 103 while motors constituting the three drive units 101 to 103 are constantly rotated and operated.

Each of motors constituting the three drive units 101 to 103 constantly rotates and operates regardless of whether the first and second links 59 and 63 are operated or static. The influence of static friction thus can be canceled in a model-less manner, that is, canceled without a special mechanism or a compensation model.

Furthermore, the configuration in which three motors drive two drive axes (i.e., 1.5 motors drive one drive axis) enables the parallel link device 1500 including the smaller number of motors. The configuration can reduce manufacturing costs, and inhibit the inertia of each shaft and the size of a mechanism.

Furthermore, in the parallel link device 1500 in FIGS. 15 and 16, a distance L1 between the rotation axis of the first active joint part $J_8$ and the rotation axis of the first rotary joint part $J_1$ is equal to a distance L2 between the rotation axis of the second rotary joint part $J_2$ and the rotation axis of the third rotary joint part $J_3$. Furthermore, a distance L3 between the rotation axis of the second active joint part $J_9$ and the rotation axis of the second rotary joint part $J_2$ is equal to a distance L4 between the rotation axis of the first rotary joint part $J_1$ and the rotation axis of the third rotary joint part $J_3$. That is, the four-joint link mechanism FL of the first arm part 50a is configured as a parallel link mechanism. The "parallel link mechanism" here is a link mechanism in which a plurality of links forms a parallelogram or a rhombus. Note that, although the four-joint link mechanism FL is not required to be a parallel link mechanism, the parallel link mechanism facilitates the structural design of the parallel link device 1500 and the control of the position and posture of the movable plate 40. Then, as described above, the drive device 100 according to the embodiment is applied to the fourth link 57 of the four-joint link mechanism FL. The fourth link 57 is controlled to have two degrees of freedom.

The fourth link 57 of the four-joint link mechanism FL is an L-shaped right-angle link. The shape of the fourth link 57 is not limited to the L shape, and may be, for example, a T shape. A fourth rotary joint part $J_4$, which is a one-axis rotary joint, is provided from a part 57a to a part 57b in the L-shaped fourth link 57. The part 57a is positioned between the first and third rotary joint parts $J_1$ and $J_3$ of the four-joint link mechanism FL. The part 57b extends in a direction orthogonal to the plane constituted by the four-joint link mechanism FL. The rotation axis of the fourth rotary joint part $J_4$ is orthogonal to the rotation axis of each joint part of the four-joint link mechanism FL. The fourth rotary joint part $J_4$ couples the four-joint link mechanism FL and the serial link mechanism SL.

The serial link mechanism SL couples the four-joint link mechanism FL and the movable plate 40 with four degrees of freedom. In the illustrated parallel link device 1500, the serial link mechanism SL includes a fifth link 55 and a rotary joint of three degrees of freedom. The fifth link 55 is coupled to the part 57b of the fourth link 57 via the fourth rotary joint part $J_4$. The rotary joint of three degrees of freedom is connected to the head-end side of the fifth link 55. The rotary joint of three degrees of freedom includes a fifth rotary joint part $J_5$, a sixth rotary joint part $J_6$, and a seventh rotary joint part $J_7$. These rotary joint parts are all one-axis rotary joints. The rotation axes of the fourth to seventh rotary joint parts $J_4$ to $J_7$ are orthogonal to each other. Here, although the rotation axes of the fourth to sixth rotary joint parts $J_4$ to $J_6$ are not necessarily required to be orthogonal to each other, these rotary joint parts are desirably orthogonal to each other in structural design or control calculation.

The fifth link 55 is coupled to a sixth link 53 by the fifth rotary joint part $J_5$. The sixth link 53 is coupled to a seventh link 51 by the sixth rotary joint part $J_6$. Each of the sixth and seventh links 53 and 51 may be an L-shaped right-angle link. The sixth and seventh links 53 and 51 may have two orthogonal surfaces. The shapes thereof are not limited to an L shape, and may be a T shape, for example. The seventh link 51 is coupled to the fixing part 41a of the movable plate 40 by the seventh rotary joint part $J_7$, which is a one-axis rotary joint.

The rotation axis of the seventh rotary joint part $J_7$ is oriented in the direction of the center point Q of the movable plate 40. The seventh rotary joint part $J_7$ intersects with an axis $Ax_0$ as seen along the axis $Ax_0$ with the rotation axis (e.g., rotation axis $O_8$) of a rotary joint part of the four-joint link mechanism FL and a rotation axis $O_7$ of the seventh rotary joint part $J_7$ being in parallel with each other. The axis $Ax_0$ connects the rotation center point P and the rotation center point Q. The rotation center point P is for the coupling positions of the base plate 30 and the plurality of link parts 50a, 50b, and 50c. The rotation center point Q is for the coupling positions of the movable plate 40 and the plurality of link parts 50a, 50b, and 50c.

In the illustrated parallel link device 1500, the serial link mechanism SL includes a rotary joint of three degrees of freedom at the head-end side to which the movable plate 40 is coupled. This inhibits grow in size of the entire device, and prevents interference of, for example, each link and the movable plate 40. Note that the fifth and sixth rotary joint parts $J_5$ and $J_6$ may include a two-axis rotary joint. Alternatively, the sixth and seventh rotary joint parts $J_6$ and $J_7$ may include a two-axis rotary joint.

The four-joint link mechanism FL and the movable plate 40 are coupled by the serial link mechanism SL at four degrees of freedom. Furthermore, as described above, the fourth link 57 of the four-joint link mechanism FL can be controlled by the drive device 100 according to the embodiment at two degrees of freedom. The serial link mechanism SL is coupled to the four-joint link mechanism FL. For this reason, the first arm part 50a has arm structure having six degrees of freedom.

Furthermore, the second arm part 50b and the third arm part 50c include a four-joint link mechanism FL and a serial link mechanism SL, respectively, and have the same configuration as the first arm part 50a. The first to fourth links 57, 59, 61, and 63 are coupled in the four-joint link mechanism FL. The fifth to seventh links 51, 53, and 55 are coupled in the serial link mechanism SL. The second and third arm parts 50b and 50c can also be controlled by the drive device 100 according to the embodiment at six degrees of freedom.

That is, the movable plate 40 is supported by the first to third link parts 50a to 50c, each of which has six degrees of freedom. The movable plate 40 can perform translational motion of three degrees of freedom and rotary motion of three degrees of freedom. Consequently, the three-dimensional position and the three-dimensional posture of the movable plate 40 can be freely changed in space. In the parallel link device 1500 having such configuration, the seventh rotary joint part $J_7$ intersects with an axis $Ax_0$ as seen along the axis $Ax_0$ with the rotation axis (e.g., rotation axis $O_8$) of a rotary joint part of the four-joint link mechanism FL and a rotation axis $O_7$ of the seventh rotary joint part $J_7$ being in parallel with each other. The axis $Ax_0$ connects the rotation center point P and the rotation center point Q. The rotation center point P is for the coupling positions of the base plate 30 and the plurality of link parts 50a, 50b, and 50c. The rotation center point Q is for the coupling positions of the movable plate 40 and the plurality of link parts 50a, 50b, and 50c. In the parallel link device 1500 according to the embodiment, a rotation axis $O_7$ of the seventh rotary joint part $J_7$ of the three link parts 50a, 50b, and 50c intersects with the rotation center point Q of the movable plate 40.

For this reason, not only the movable range of translational motion of three degrees of freedom but also the movable range of rotary motion of three degrees of freedom are increased. The movable range of the movable plate 40 is expanded as compared to a traditional parallel link device. For example, the parallel link device 1500 can achieve rotary motion of three degrees of freedom in the movable range of nearly plus or minus 90 degrees. The rotation movable range of plus or minus 90 degrees corresponds to the movable range of a human wrist.

Furthermore, in the illustrated parallel link device 1500, a total of six motors for controlling the postures of the first to third link parts 50a to 50c can be provided on the base plate 30. Consequently, the parallel link device 1500 can be configured such that the mass of each motor is not driven by each motor.

Furthermore, in the parallel link device 110, a motor is provided on the base plate 130, the four-joint link mechanism FL is coupled to the base plate 130, and the serial link mechanism SL is coupled to the head-end side of the four-joint link mechanism FL. For this reason, the parallel link device 110 has reduced inertia on the head-end side, which is advantageous for controlling the three-dimensional position or three-dimensional posture of the movable plate 140.

INDUSTRIAL APPLICABILITY

Technology disclosed in the present specification has been described in detail above with reference to the specific embodiment. It is, however, obvious that those skilled in the art can modify or substitute the embodiment without departing from the gist of the technology disclosed in the present specification.

In the present specification, the drive device disclosed in the present specification can simultaneously drive two arms, and can be applied to a multi-link structure such as a robot.

In short, the technology disclosed in the present specification has been described by way of example, and the contents described in the present specification should not be interpreted restrictively. The claims should be considered in order to determine the gist of the technology disclosed in the present specification.

Note that the technology disclosed in the present specification may have the following configurations.

(1) A drive device including:
a first drive unit;
a second drive unit;
a third drive unit;
a first differential unit connected to the first drive unit and the second drive unit;
a second differential unit connected to the second drive unit and the third drive unit; and
a control unit that controls the first to third drive units.

(2) The drive device according to (1),
in which the first differential unit is driven on the basis of difference in motions of the first drive unit and the second drive unit, and
the second differential unit is driven on the basis of difference in motions of the second drive unit and the third drive unit.

(3) The drive device according to (1) or (2),
in which the control unit controls drive of the first differential unit on the basis of difference in motions of the first drive unit and the second drive unit, and controls drive of the second differential unit on the basis of difference in motions of the second drive unit and the third drive unit.

(4) The drive device according to any one of (1) to (3),
in which the control unit controls the second drive unit at a constant speed, and controls a speed of each of the first drive unit and the third drive unit relative to that of the second drive unit.

(5) The drive device according to (4),
in which the control unit performs control such that difference or a ratio of a speed of the first drive unit relative to that of the second drive unit and a speed of the third drive unit relative to that of the third drive unit is in a predetermined range.

(6) The drive device according to any one of (1) to (5),
in which the control unit:
controls drive of the first differential unit on the basis of a speed of the second drive unit, and controls drive of the second differential unit on the basis of a speed of the third drive unit relative to that of the second drive unit at a time of failure of the first drive unit; or
controls drive of the second differential unit on the basis of a speed of the second drive unit, and controls drive of the first differential unit on the basis of a speed of the first drive unit relative to that of the second drive unit at a time of failure of the third drive unit.

(7) The drive device according to any one of (1) to (6),
in which the control unit controls drive of the first differential unit on the basis of a speed of the first drive unit, and controls drive of the second differential unit on the basis of a speed of the third drive unit at a time of failure of the second drive unit.

(8) The drive device according to any one of (1) to (7), further including
a coupling part that couples the second drive unit and the second differential unit, or couples the second drive unit and the first differential unit.

(9) The drive device according to any one of (1) to (8),
in which the first differential unit and the second differential unit include a differential gear mechanism.

(10) A robot device including:
a first drive unit;
a second drive unit;
a third drive unit;
a first differential unit connected to the first drive unit and the second drive unit;
a second differential unit connected to the second drive unit and the third drive unit;
a first arm part attached to the first differential unit;
a second arm part attached to the second differential unit; and
a control unit that controls the first to third drive units.

REFERENCE SIGNS LIST

100 Drive device
101 First drive unit
102 Second drive unit
103 Third drive unit
111 First differential unit
112 Second differential unit
121 First arm part
122 Second arm part
201 Side gear
202 Side gear
203 Pinion gear
601 Side gear
602 Side gear
603 Pinion gear
1000 Drive device
1001 Belt
1100 Control system
1101 Control unit

The invention claimed is:
1. A drive device comprising:
a first driver;
a second driver;
a third driver;
a first differential structure connected to the first driver and the second driver;
a second differential structure connected to the second driver and the third driver;
a belt that couples the second driver and the second differential structure, or couples the second driver and the first differential structure; and
circuitry that controls the first driver, the second driver, and the third driver,
wherein the circuitry controls the second driver at a constant speed, and controls a speed of each of the first driver and the third driver relative to that of the second driver, and the constant speed, the speed of the first driver, and the speed of the third driver are each greater than zero.

2. The drive device according to claim 1,
wherein the first differential structure is driven on a basis of difference in motions of the first driver and the second driver, and
the second differential structure is driven on a basis of difference in motions of the second driver and the third driver.

3. The drive device according to claim 1,
wherein the circuitry controls drive of the first differential structure on a basis of difference in motions of the first driver and the second driver, and controls drive of the second differential structure on a basis of difference in motions of the second driver and the third driver.

4. The drive device according to claim 1,
wherein the circuitry performs control such that a difference or a ratio of a speed of the first driver relative to that of the second driver and a speed of the third driver relative to that of the second driver is in a predetermined range of a predetermined value in order to create a lower speed for the first driver, the second driver, or the third driver than if the control was not performed.

5. The drive device according to claim 1,
wherein the circuitry:
controls drive of the first differential structure on a basis of a speed of the second driver, and controls drive of the second differential structure on a basis of a speed of the third driver relative to that of the second driver at a time of failure of the first driver; or
controls drive of the second differential structure on a basis of a speed of the second driver, and controls drive of the first differential structure on a basis of a speed of the first driver relative to that of the second driver at a time of failure of the third driver.

6. The drive device according to claim 1,
wherein the circuitry controls drive of the first differential structure on a basis of a speed of the first driver, and controls drive of the second differential structure on a basis of a speed of the third driver at a time of failure of the second driver.

7. The drive device according to claim 1,
wherein the first differential structure and the second differential structure include a differential gear mechanism.

8. A robot device comprising:
a first driver;
a second driver;
a third driver;
a first differential structure connected to the first driver and the second driver;
a second differential structure connected to the second driver and the third driver;
a first arm part attached to the first differential structure;
a second arm part attached to the second differential structure;
a belt that couples the second driver and the second differential structure, or couples the second driver and the first differential structure; and
circuitry that controls the first driver, the second driver, and the third driver,
wherein the circuitry controls the second driver at a constant speed, and controls a speed of each of the first driver and the third driver relative to that of the second driver, and the constant speed, the speed of the first driver, and the speed of the third driver are each greater than zero.

* * * * *